US010542185B2

(12) United States Patent
Morovic et al.

(10) Patent No.: US 10,542,185 B2
(45) Date of Patent: Jan. 21, 2020

(54) COLOR PRINTING LOOK-UP-TABLE (71) Applicants: Jan Morovic, Colchester (GB); Peter Morovic, Sant Cugat del Valles (ES); HEWLETT-PACKARD DEVELOPMENT COMPANY, L.P., Houston, TX (US)

(72) Inventors: Jan Morovic, Colchester (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 18 days.

(21) Appl. No.: 15/541,394

(22) PCT Filed: Jan. 29, 2015

(86) PCT No.: PCT/EP2015/051827
§ 371 (c)(1),
(2) Date: Jul. 3, 2017

(87) PCT Pub. No.: WO2016/119858
PCT Pub. Date: Aug. 4, 2016

(65) Prior Publication Data
US 2018/0007237 A1    Jan. 4, 2018

(51) Int. Cl.
*H04N 1/60* (2006.01)
*H04N 1/405* (2006.01)
*H04N 1/52* (2006.01)

(52) U.S. Cl.
CPC ......... *H04N 1/6019* (2013.01); *H04N 1/4053* (2013.01); *H04N 1/4057* (2013.01); *H04N 1/52* (2013.01); *H04N 1/6058* (2013.01)

(58) Field of Classification Search
CPC .. H04N 1/6019; H04N 1/4053; H04N 1/4057; H04N 1/52; H04N 1/6058
(Continued)

(56) References Cited

U.S. PATENT DOCUMENTS 6,091,849 A    7/2000 Spaulding et al.
7,450,269 B2   11/2008 Tai et al.
(Continued)

FOREIGN PATENT DOCUMENTS

CN    1509888    7/2004
CN    1795666    6/2006
(Continued)

OTHER PUBLICATIONS

Sullivan J et al: "Design of Minimum Visual Modulation Halitone Patterns", IEEE Transactions on Systems, Man and Cybernetics, IEEE Inc. New York, US, vol. 21.

*Primary Examiner* — Quang N Vo
(74) *Attorney, Agent, or Firm* — HP Inc. Patent Department (57) ABSTRACT

A look-up table for use in a printing system is created. The printing system prints an input image in a print color space. The look-up table is created by accessing a predetermined look-up table representing a mapping of color values of an input color space to ink-vectors of a print color space; applying a p-by-q halftone threshold matrix to each ink-vector of the predetermined look-up table to generate a p-by-q halftone cell for each ink-vector; and creating a further look-up table which maps, at least a sample of, the color values of input color space to the at least one halftone cell.

13 Claims, 5 Drawing Sheets

(58) Field of Classification Search
 USPC .................. 358/3.23, 1.9, 1.15, 3.06, 3.13
 See application file for complete search history.

(56) References Cited

U.S. PATENT DOCUMENTS

| | | |
|---|---|---|
| 7,733,526 B2 | 6/2010 | Kim et al. |
| 8,537,424 B1 | 9/2013 | Keithley et al. |
| 8,643,904 B2 | 2/2014 | Kuno |
| 2007/0030505 A1* | 2/2007 | Ito ................ H04N 1/6019 358/1.9 |
| 2011/0063632 A1 | 3/2011 | Klassen et al. |
| 2011/0096364 A1 | 4/2011 | Morovic et al. |
| 2012/0113444 A1 | 5/2012 | Yoshida et al. |
| 2013/0021631 A1* | 1/2013 | Nachlieli .......... H04N 1/6047 358/1.9 |
| 2015/0161488 A1* | 6/2015 | Okumura .......... G06K 15/1868 358/1.9 |

FOREIGN PATENT DOCUMENTS

| | | |
|---|---|---|
| CN | 101072291 | 11/2007 |
| EP | 0578110 | 1/1994 |
| EP | 1011263 | 6/2000 |
| EP | 1507404 | 2/2005 |
| WO | WO-2005043889 | 5/2005 |
| WO | WO-2014173435 | 10/2014 |

\* cited by examiner

COLOR PRINTING LOOK-UP-TABLE

BACKGROUND

Printing systems implement some data transformation that converts pixels of an input image in RGB (or in any other color space) to drops of printing fluid (e.g. ink) on a media. The data transformation may include aspects of color management and conversion of colors between different color spaces, e.g. converting an input RGB image to a CMYK image. The data transformation may also include transformation of the input image into a format suitable for printing using drops of printing fluid, for example halftoning the input image into a pattern of dots. These transformations are achieved by a plurality of pipeline stages to generate the control data for controlling a printing device to deposit the drops of printing fluid.

BRIEF DESCRIPTION OF DRAWINGS

For a more complete understanding, reference is now made to the following description taken in conjunction with the accompanying drawings in which.

DETAILED DESCRIPTION

Figure 1:
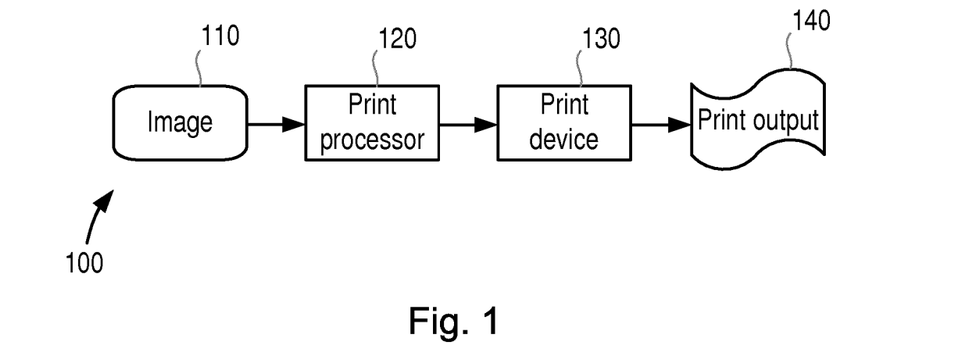
FIG. 1 is a simplified schematic of an example of a printing system.

FIG. 1 shows an example of a printing system 100 that may be used with the methods described herein. The printing system 100 produces a print output. The print output 140 comprises colored inks deposited on a substrate which may be paper, fabric, plastic or any other suitable print medium. In the example of FIG. 1, input image data corresponding to an image 110 is sent to a print processor 120. The print processor 120 processes the image data. The print processor 120 then outputs print control data that is communicated to a printing device 130. The printing device 130 generates a print output 140 as instructed by the print control data. The examples described herein apply to substrate printing fluids containing color pigments, e.g. colored inks. However, in addition, other printing fluids may be used to alter the appearance of a printed output without color pigmentation, e.g. through the application of gloss or the like, or to provide treatment of the substrate printing fluids, e.g. fixers or the like.

The printer processor 120 may process the input image data via a plurality of pipeline stages. One of these pipeline stages may comprise, for example, color separation to transform the pixels of the input image in its color space (e.g. RGB) into the color space of the printing device (e.g. CMYK). This transformation may be carried out by a look-up operation of a pre-computed look-up table representing a mapping of the color values of a color gamut of the color space of the input image to color values in the color space of the printing device. The another pipeline stage may comprise a halftone stage in which the color converted image, having continuous tone, is converted to a halftone image in which each pixel defined in the color space of the printing device (for example defined by the amount of each ink of the printing device) is additionally defined by a pattern of how each dot of each ink is placed (e.g. superimposed, overlapping, size of dots) in order to give the printed image the appearance of continuous tones.

Examples described herein refer to combinations of primary inks known as the Neugebauer Primaries (NPs) to define how each pixel of the input image is to be printed. For a binary (bi-level) printer, an NP is one of $2^k$ combinations of k inks within the printing system, wherein inks can be represented in single-drop states, in a k-dimensional color space. For example, if a printing device uses CMY inks there can be eight NPs, these NPs relate to the following: C, M, Y, C+M overprinting (or blue), C+Y overprinting (or green), M+Y overprinting (or red), C+M+Y overprinting (or black), and W (or white or blank indicating an absence of ink). As is clear, a printing device with many primary inks and many ink-drop states can have more NPs available than a printing device having a few primary inks and having bi-level states.

Distributions of NPs over a unit area are referred to as Neugebauer Primary area coverages or "NPacs". NPacs serve as the input for the halftoning procedure. This may be seen as selecting one of the NPs at every halftone pixel. A certain color may correspond to a certain NPac in the pre-computed LUT. The NPac may be represented as a vector, wherein $[W, C, M, CM]=[a_W\%, a_C\%, a_M\%, a_{CM}\%]$, where $a_C$ is the percentage area coverage for cyan ink, $a_M$ is the percentage area coverage for magenta ink, $a_{CM}$ is the percentage area coverage for cyan/magenta combination, and $a_W$ is the percentage area coverage of white or absence of ink and where $a_W\%+a_C\%+a_M\%+a_{CM}\%=100\%$.

It should be noted that there is a multitude of NPacs that correspond to any one ink-vector as used by comparative printing systems. Each of these NPacs however has a different combination of reflectance and color and therefore gives access to a much larger variety of colors or larger printable gamut. On the other hand, multiple NPacs may have the same color (being that color's set of metamers) while differing in spectral reflectance. There may also be multiple NPacs with the same color and/or reflectance but with different use of the available NPs.

A look-up-table (LUT) is used to determine, for each pixel of the input image data, the NPac which is defined by the set of NPs (inks and their overprints) and their corresponding area coverages.

Figure 2:
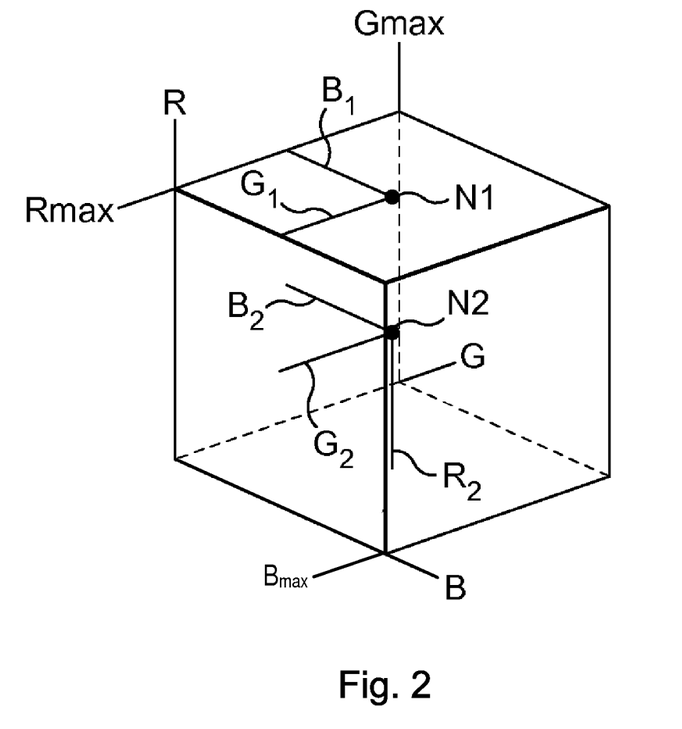
FIG. 2 is a diagram of a three-dimensional, RGB, look-up-table.

FIG. 2 is a diagram of an example of an LUT. The LUT shown has the form of a cube and is indexed in a color space of the input image such as RGB in this example. The table has nodes each of which contains data defining at least one NPac to be used to reproduce a particular color having coordinates R, G, B. For any node indexed by RGB, the node contains at least one ink-vector (in the example of Halftone Area Neugebauer Separation (HANS), the node contains at least one NPac) that when halftoned over a unit area results in a color (XYZ) that is chosen to map to the RGB color space of the input image.

FIG. 2 shows by way of example a surface node N1 having coordinates Rmax, G1, B1 and an interior node N2 having coordinates R2, G2, B2. The nodes at the surface may be regarded as being in a layer at the surface. Successive layers of nodes lie below the surface. Thus, the LUT provides a discrete, non-continuous, representation of the colors to be printed. This example relates to RGB color to be printed using CMY inks. However, some printing systems may operate based on four or more colors, for example C, M, Y and K, where K is black. In this case this printing system would use an LUT having an n-dimensional output, where n is four or more.

An LUT could be either 3D RGB or 4D CMYK (or more dimensions) for example, with the node complexity changing as a function of the number of NPs. For example, a CMY bi-level set-up would have nodes with up to eight NPs and their respective area coverages (i.e. NPacs that can have up to eight NPs and proportions), while a three-level (0, 1, 2 drop) CMYK system may have up to eighty one NPs and their respective area coverages.

The print output 140 of the printing system 100 may be judged in terms of its attributes such as smoothness, noise or grain, color constancy under different viewing conditions and the use of resources, such as, for example, ink. For many attributes, the performance of the printing system 100 is worse in some parts of the color gamut than in others.

In an example, the full gamut LUT of FIG. 2 may be optimised, to comply with a predetermined value of resource usage and/or quality of attribute. For example, the full gamut color LUT of FIG. 2 is optimised to provide a further LUT which includes NPacs which comply with a predetermined value of resource usage and/or quality of attribute(s). For example, the further LUT could include only those NPacs which provide minimum ink usage, or a minimum level of robustness, that is, those NPacs that exhibit the lowest level of variations during simulations of fluctuations in the printing device operating parameters, such as ink drop placement errors, ink-pen health, missing nozzles, misalignment, ink drop weight variations, or the like.

Figure 4A:
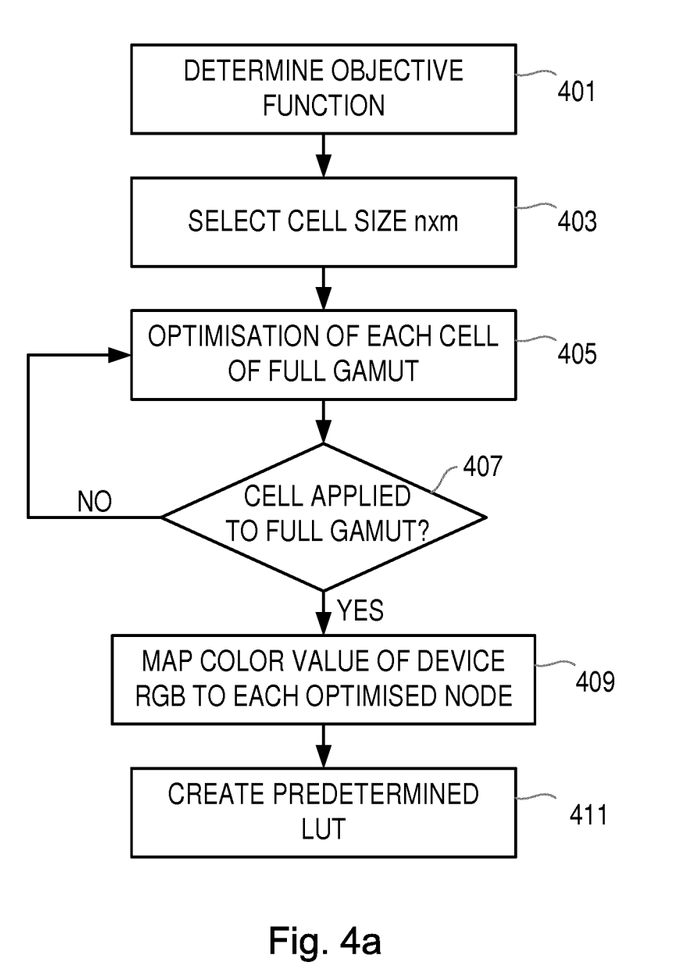
FIGS. 4a and 4b, in combination, is a flowchart of an example of a method of creating a look-up table.

In one example, shown in FIG. 4a, the full gamut color LUT may be optimised to create a predetermined LUT. First, an objective function is determined, 401. This may be determined by the operator or may be determined automatically by the printer processor 120. The objective function comprises at least one metric, for example, resource usage (e.g. ink usage), or attribute (e.g. smoothness, noise, grain, color constancy). Each metric may have a threshold value associated therewith for compliance with the metric or each metric may be defined to be a minimum or maximum. For example, the objective function may be determined to be ink usage such that each node of the full gamut LUT can be optimised to select an NPac for each color that has the chosen property at the optimum (in the example mentioned previously, for ink usage, the NPac of a given color that provides the lowest ink usage). Here each node of the LUT is populated with the most optimal NPacs. Next a cell size is selected, 403. For a cell comprising an n-by-m array, the values of n and m are selected. The cell size is selected to determine the smallest area coverage permissible in the optimisation (e.g. ¼, ¹⁄₁₆, . . . ) as well as the granularity and the degree to which optimality can be represented. Therefore, in selection of a cell size, consideration is given to the type of content and the print resolution.

Figure 3:
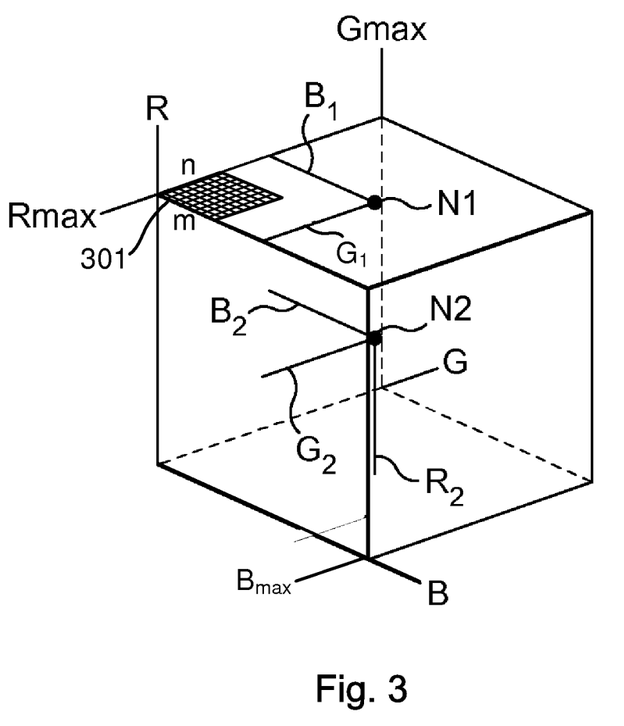
FIG. 3 is a diagram of cell division of the look-up-table of FIG. 2.

Next an optimisation is carried out, 405, for example an HANS optimisation. As illustrated in FIG. 3, a cell 301 having the selected cell size (n-by-m) is applied, 407, across each layer of the full gamut color LUT, for example, as shown in FIG. 2. In one example, for each cell 301, the optimisation, 405, carried out by at least one optimised NPac being retained for each node for each cell. In the example above, the NPacs retained for each node are those with minimal ink usage, i.e., all nodes are populated, each with at least one NPac at the minimal ink usage corresponding to that node's color. As a result, a further LUT is created that represents a mapping of the nodes to at least one optimised NPac, that is, one NPac or a series of NPacs that meets criteria of the objective function.

Given the International Color Consortium (ICC) profile, that interprets the device RGB (or CMYK) of the input image color space as a color, a mapping of the device RGB is created, 409, to each node of optimised NPacs. As an LUT has been created that represents a mapping of each node to at least one optimised NPac, a predetermined LUT is created, 411, which represents a mapping of the device RGB to at least one NPac. In one example, the predetermined LUT represents a mapping of all of the device RGB values to at least one NPac. In another example, the predetermined LUT represents a mapping of a sample of the RGB values to at least one NPac. The sampling may be regular sampling of the RGB cube. For example, for two levels this would yield 8 samples (the vertices), for three levels there would be 29 samples, etc. which always forms a regular grid values.

Figure 4B:
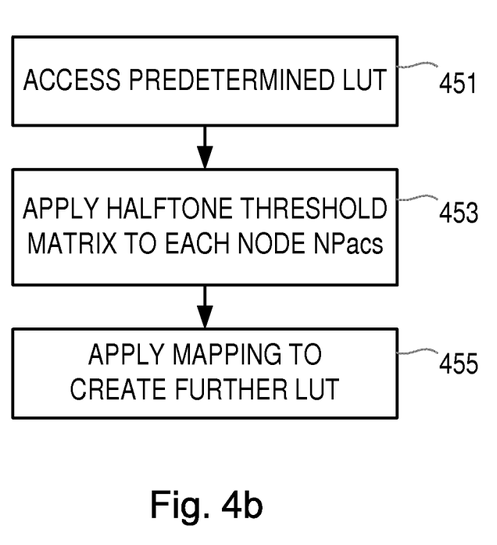

As shown in FIG. 4b, the predetermined LUT is accessed, 451. In one example, this may comprise the predetermined LUT created (output) by the process shown in the example of FIG. 4a. Each of the node NPacs of each optimised node is halftoned, 453 by applying a halftone threshold matrix to each node NPac of the predetermined LUT. The halftone threshold matrix comprises a p-by-q array of threshold values. In one example, the values of p and q correspond to the values of n and m of the cell selected, 403 in the process of FIG. 4a. Each NPac of the predetermined LUT is compared to each threshold value. In one example, this returns the first NP, whose cumulative area coverage exceeds the threshold value and this is placed in a p-by-q array at the corresponding location of the threshold to create a halftone cell (a p-by-q array of halftoned NPacs). For example, NPac area coverages (in a cumulative representation) are compared against thresholds and it is the first NP whose cumulative area coverage exceeds the threshold that is placed in the halftone cell. In more detail, if the NPac is [W=70%, C=10%, M=20%], then its cumulative representation is [W=70%, C=80%, M=100%]. For a threshold value of up to 70%, the corresponding halftone location is left blank (white), for a threshold value between 70% and 80%, cyan is placed in the halftone cell and for a threshold above 80%, it is magenta that results. Each NPac of the predetermined LUT is then replaced by the corresponding halftone cell to create a further LUT that represents a mapping of a device RGB, or at least a sample of the device RGB, to at least one halftone cell.

In one example, the process of FIG. 4b is repeated for different values of p and/or q of the threshold halftone matrix to create different sized halftone cells for each NPac in the further LUT.

The method of FIGS. 4a and 4b is implemented by a computer program run in a computer. The computer may be separate from the printing system 100 of FIG. 1 or could be a part of the print processor 120 of FIG. 1. The method of FIGS. 4a and 4b is performed independently of actual data representing an image to be printed.

Other metrics (attributes or resource usages) may also be controlled. The foregoing description refers to controlling ink usage in a printing system. However the disclosure may be applied to controlling attributes of a printed image, such as grain and color constancy. The threshold values of the metric may be determined by printing a test image and measuring the attribute to be controlled, or by computing it directly as is the case in the examples of ink usage. In another example, the objective may be a minimization/maximization of some metric, for example, minimisation of ink usage as described above.

In one implementation, one or more attributes and resource usage may be controlled. A combination of attributes and/or of one or more attributes and one or more resources usage may be controlled at the same time. As set out above, the method starts with an initial gamut represented by a full LUT. The full LUT stores the result of applying different metrics to each of its nodes. A user can then set multiple constraints and the optimal NPacs of each node that simultaneously satisfy them all are identified and a predetermined LUT is built to map to them. In an example of the disclosure, the predetermined LUT and the further LUT is built off-line, e.g. independently of the printing system.

Figure 5:
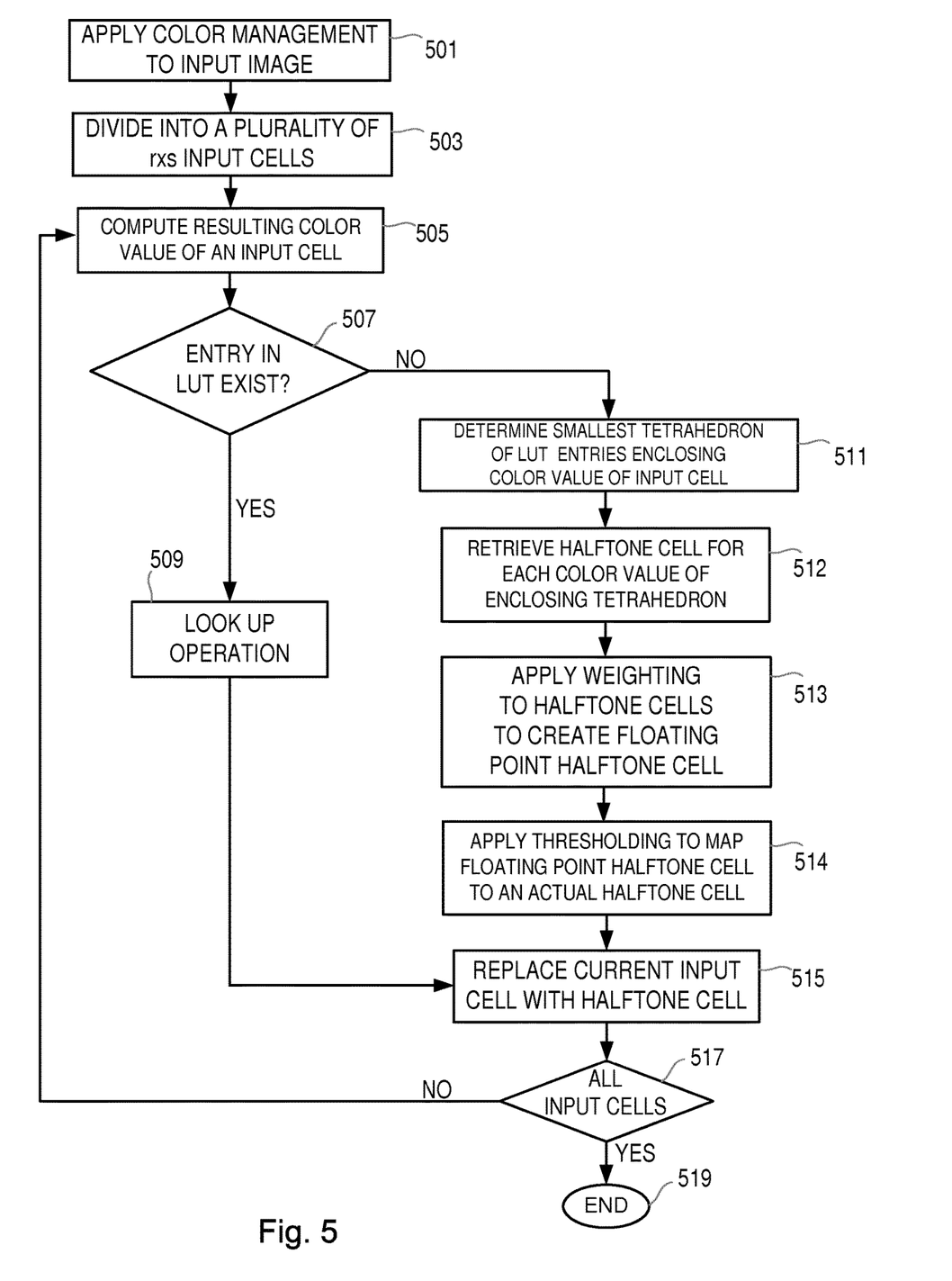
FIG. 5 is a flowchart of an example of a method of processing color input images.

Referring to FIG. 5, a color input image 110 is processed by the printer processor 120 to generate the control data for printing the color input image 110 by the printing device 130, by look-up operations of the further LUT created by the example described above with reference to FIG. 4b.

For a given color input image 110, color management is applied, 501, to transform the color input image into a device RGB (or CMYK) space. The transformed input image is divided, 503, into a plurality of input cells. Each input cell comprises an r-by-s array of pixels, where, in one example, r may equal s and, in a further example r=s=1, i.e. a single pixel. For each input cell, a resulting color value is computed, 505. In one example, an average color value is computed, 505. In the example of FIG. 5, it is determined whether the resulting RGB color values for each input cell exists as an entry in the further LUT, 507 (if the further LUT comprises all RGB value then the entry will exist but if the further LUT comprises a sample of the RGB values, then an entry may not exist). If the entry exists, a look-up operation is performed, 509 and the corresponding at least one halftone cells are returned. One of the halftone cells is selected. The selection may be based on the resolution, for example, for a printed image having a resolution t times greater than the resolution of the input image, a halftone cell is selected that has a size t times greater than the input cell size r-by-s. For example, if the value of t is 4, then a 4×4 halftone cell is selected to replace a 1×1 input cell of the input image, i.e. a single pixel, or a 16×16 halftone cell is selected to replace a 4×4 input cell of the input image. In the example above of a single pixel (1×1 input cell), the color value of the pixel is directly input for the look-up operation of the LUT and a halftone cell is selected, e.g. a 4×4 halftone cell. The halftone cell may also be selected from those halftone cells output by the look-up operation based on the grain or patterning to avoid tiling of the same halftone cell over some area coverage. In another example, compression, especially ICF compression fits well. In the example above, there is an n-by-m input cell which is compressed with a smaller number of RGB values (by the averaging of the input cell) and as a result a direct 4×4 halftone cell could replace a 4×4 input cell.

If no entry for the resulting RGB color value of the input cell exists in the further LUT (for example, the further LUT comprises a sample of the RGB values), an interpolation of the resulting RGB color values is performed. This is achieved by determining, 511, the smallest polyhedron (e.g. tetrahedron or cube) formed by RGB values which are included in the further LUT which encloses the RGB value of the input cell. Barycentric coordinates are computed for the color value of the input cell and the enclosing polyhedron RGB values and these coordinates are applied, 513, as weights to the halftone cells corresponding to the nodes of the enclosing polyhedron, 512. The result is an n-by-m input cell where at each pixel there is a set of values, one per ink, that is, a floating point halftone cell. Since the values need to be integer values (drops of printing fluid) for printability (it is not possible to print fractional drops), the floating point output of the interpolation needs to be rounded to integer values. For example, if there were only two cells that were interpolated between, each being of only a single pixel, then the result would be, for example, for weight of 0.8 for cell 1 with a CMYK ink drop vector of [0, 2, 1, 0] (i.e., no cyan or black ink, two drops of magenta a drop of yellow) and weight 0.2 for cell 1 with a CMYK ink drop vector of [0, 0, 2, 0], the resulting interpolated ink drop vector would be [0, 1.6, 1.2, 0], which after rounding would become [0, 2, 1, 0]. In one example, four p-by-q ink drop matrices would result each of the pixels, that a thresholding is applied, 514, to map the floating point halftone cell to an actual halftone cell with discrete drops per pixels.

The selected (or actual) halftone cell then replaces, 515, the current input cell. Blocks 501 to 517 are repeated for all input cells. Once all the input cells have been replaced by a halftone cell, the process ends, 519.

A random rotation may be applied to the selected halftone cells as it replaces each input cell of the input image to provide a result having less of a repetitive halftone output. The resulting image of halftone cells is then used to create the control data for the printing device 130.

Examples of the disclosure are described above with reference to a HANS printing system. However, the disclosure is also applicable to non-HANS printing pipelines.

At least some aspects of the examples described herein with reference to the drawings may be implemented using computer processes operating in processing systems or processors. These aspects may also be extended to computer programs, particularly computer programs on or in a carrier, adapted for putting the aspects into practice. The program may be in the form of non-transitory source code, object code, a code intermediate source and object code such as in partially compiled form, or in any other non-transitory form suitable for use in the implementation of processes described herein. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

An example of the disclosure provides a tangible and non-transient computer readable medium storing a computer program which when run on a computer causes the computer to implement the creation a look-up-table for use by a printing system by accessing, 451, a predetermined look-up table representing a mapping of color values of an input color space to ink-vectors of a print color space; applying, 453, a p-by-q halftone threshold matrix to each ink-vector of the predetermined look-up table to generate a p-by-q halftone cell for each ink-vector; creating, 455, a further look-up table which maps, at least a sample of, the color values of input color space to the halftone cell of each corresponding ink-vector.

Similarly, it should be understood that a controller may in practice be provided by a single chip or integrated circuit or plural chips or integrated circuits, optionally provided as a chipset, an application-specific integrated circuit (ASIC), field-programmable gate array (FPGA), etc. For example, this may apply to all or part of a controller or other printer control circuitry. The chip or chips may comprise circuitry (as well as possibly firmware) for embodying at least a data processor or processors as described above, which are configurable so as to operate in accordance with the described examples. In this regard, the described examples may be implemented at least in part by computer software stored in (non-transitory) memory and executable by the processor, or by hardware, or by a combination of tangibly stored software and hardware (and tangibly stored firmware).

A print system that uses NPacs in image processing is a Halftone Area Neugebauer Separation (HANS) printing pipeline. NPacs are specific to HANS. HANS is an image processing system using NPs and NP area coverages (NPacs) and halftoning that may be optimized for a predetermined ink usage, grain or other print attributes such as smoothness, noise, grain or color constancy. (It should be appreciated that the disclosure may be used with other printing systems.)

In the examples above, a LUT that combines a metric-optimized color pipeline such as those computed in the context of HANS or others requires both custom hardware that is capable of interpolating in an appropriate domain (ink vectors for a normal pipeline, NPacs for HANS) and the subsequent step of halftoning. As a result, proving benefits of a HANS, or otherwise optimised pipeline without the need to have a custom halftoning algorithm implemented and without an explicit color separation step either. The further LUT created is a single color look-up table (LUT) that takes device color (e.g. RGB) as input and results in pre-halftoned cells that are placed directly for corresponding input cells of an input image, much like a stencil operation. This provides faster pipeline stages as either just interpolation or just a look-up operation takes place, without a separate halftoning stage.

It should be noted that the above-mentioned examples illustrate rather than limit what is described herein, and that those skilled in the art will be able to design many alternative implementations without departing from the scope of the appended claims. The word "comprising" does not exclude the presence of elements other than those listed in a claim, "a" or "an" does not exclude a plurality, and a single processor or other unit may fulfil the functions of several units recited in the claims.

The invention claimed is:

1. A method of creating a look-up table for use in a printing system, the printing system printing a color input image in a print color space, the method comprising:
   accessing a predetermined look-up table representing a mapping of color values of an input color space to ink-vectors of the print color space, the print color space having a plurality of primary colors;
   applying a halftone threshold matrix to each ink-vector of the predetermined look-up table to generate a halftone cell for each ink-vector, by comparing each ink-vector to threshold values of the threshold matrix to determine a primary color of the halftone cell for each ink-vector; and
   creating a further look-up table which maps, at least a sample of, the color values of the input color space to the halftone cells that have been generated for the ink-vectors of the print color space,
   wherein the printing system uses the further look-up table in printing the color input image in the print color space.

2. The method of claim 1, wherein applying the halftone threshold matrix to each ink-vector comprises applying a plurality of halftone threshold matrices to generate a plurality of different size halftone cells for each ink-vector.

3. The method of claim 1, wherein the method further comprises creating the predetermined look-up table by:
   determining an objective function;
   selecting a cell-size;
   performing a color separation optimisation for each node of the XYZ input color space, the optimisation being based on the determined objective function and determined cell-size to generate at least one ink-vector in a print color space for each node of the XYZ input color space; and
   creating a first look-up table representing a mapping of the optimised nodes to at least one ink-vector;
   mapping a color value of the input color space to one of each of the optimised nodes; and
   creating the predetermined look-up table which maps the color values of the input color space to at least one ink-vector.

4. The method of claim 3, wherein the method further comprises:
   selecting at least one of a metric of resource usage and/or attribute of the printing system; and
   wherein determining an objective function is based on the selected at least one metric.

5. The method of claim 3, wherein mapping a color value of the input color space to one of each of the optimised nodes comprises
   mapping a regular sample of color values of the full gamut of the input color space.

6. The method of claim 3, wherein step applying a p by q halftone threshold matrix comprises
   halftoning by applying a threshold matrix of values, the threshold matrix having a size the same as the selected cell-size.

7. A method of processing a color input image into a printable format, the color input image comprising a plurality of pixels, each pixel having a color value in an input color space and the printable image comprising a plurality of printable pixels defined by an ink-vector in a print color space, the method comprising:
   responsive to an entry being present for a color value of at least one pixel of the input image within a lookup table which maps, at least a sample of, the color values of the input color space to halftone cells, retrieving a corresponding at least one halftone cell from the lookup table which matches the color value of the at least one pixel of the input image;
   responsive to the entry being absent for the color value of the at least one pixel of the input pixel within the lookup table, interpolating the at least one halftone cell from other halftone cells of other entries within the lookup table corresponding to color values enclosing the color value of the at least one pixel of the input image; and
   replacing the at least one pixel with one of the at least one halftone cell,
   wherein a printing system prints the color input image in the printable format using the at least one halftone cell that has replaced the at least one pixel of the input image.

8. The method of claim 7 wherein the method further comprises:
   dividing the plurality of pixels of the input image into a plurality of input cells, each input cell comprising a pixel array of a predetermined size;
   for each input cell:
      computing a value of color for the input cell;

carrying out the lookup operation of the color value of the input cell to retrieve a corresponding at least one halftone cell which matches the computed color value; and replacing the input cell with one of the retrieved at least one halftone cells.

9. The method of claim 7 wherein replacing the at least one pixel comprises randomly rotating the one of the at least one halftone cells; and replacing the at least one pixel with the randomly rotated one of the at least one halftone cells.

10. The method of claim 8, wherein computing a value of colors for the input cell comprises averaging the color values of the input cell.

11. The method of claim 7, wherein the method further comprises selecting one of the retrieved at least one halftone cells based on at least one attribute of the printing system, or the respective resolutions of the input image and the printed image.

12. The method of claim 7, wherein interpolating the at least one halftone cell comprises:

determining the smallest polyhedron of color values in the input color space that encloses the color value of the input cell;

carrying out a lookup operation of the color values of the enclosing polyhedron to retrieve the corresponding halftone cells;

computing barycentric co-ordinates of the color value of the input cell and the color values of the enclosing polyhedron;

applying the computed co-ordinates as weights to the retrieved halftone cells to create a floating point halftone cell; and applying thresholding to map the floating point halftone cell to an actual halftone cell.

13. One or more non-transitory computer readable storage media comprising instructions stored thereon, that when executed, direct a processor to perform a method comprising:

responsive to an entry being present for a color value of at least one pixel of an input image within a lookup table which maps, at least a sample of, the color values of the input color space to halftone cells, retrieving a corresponding at least one halftone cell from the lookup table which matches the color value of the at least one pixel of the input image;

responsive to the entry being absent for the color value of the at least one pixel of the input pixel within the lookup table, interpolating the at least one halftone cell from other halftone cells of other entries within the lookup table corresponding to color values enclosing the color value of the at least one pixel of the input image, wherein a printing system prints the color input image using the at least one halftone cell that has replaced the at least one pixel of the input image.

* * * * *